US008473193B2

(12) United States Patent
Neef et al.

(10) Patent No.: US 8,473,193 B2
(45) Date of Patent: Jun. 25, 2013

(54) METHOD AND DEVICE FOR UTILIZING SELECTABLE LOCATION MARKER FOR RELATIONAL DISPLAY OF POINT OF INTEREST ENTRIES

(75) Inventors: Edwin Neef, Amsterdam (NL); Sven Jurgens, Paris (CA)

(73) Assignee: TomTom International B.V., Amsterdam (NL)

( * ) Notice: Subject to any disclaimer, the term of this patent is extended or adjusted under 35 U.S.C. 154(b) by 1238 days.

(21) Appl. No.: 11/712,572

(22) Filed: Mar. 1, 2007

(65) Prior Publication Data

US 2007/0288161 A1 Dec. 13, 2007

(30) Foreign Application Priority Data

Mar. 8, 2006 (GB) .................................. 0604704.7
Mar. 8, 2006 (GB) .................................. 0604706.2
Mar. 8, 2006 (GB) .................................. 0604708.8
Mar. 8, 2006 (GB) .................................. 0604709.6
Mar. 8, 2006 (GB) .................................. 0604710.4

(51) Int. Cl.
*G06F 17/00* (2006.01)
*G01C 21/00* (2006.01)
*G01C 21/34* (2006.01)

(52) U.S. Cl.
USPC ........... 701/409; 701/411; 701/426; 701/454; 340/995.1; 340/995.24; 340/995.27

(58) Field of Classification Search
USPC ................. 701/200, 201, 205–209, 211, 213, 701/300, 400, 408, 409, 410, 411, 412, 413, 701/425, 426, 428, 438, 454, 467, 468, 487, 516, 538; 340/988–990, 995.1, 995.14, 995.16–995.19, 995.23–995.24, 995.27
See application file for complete search history.

(56) References Cited

U.S. PATENT DOCUMENTS

| | | | |
|---|---|---|---|
| 6,049,755 A * | 4/2000 | Lou et al. ...................... | 701/207 |
| 6,122,592 A | 9/2000 | Arakawa et al. .............. | 701/201 |
| 6,278,940 B1 * | 8/2001 | Endo ............................. | 701/209 |
| 6,321,158 B1 * | 11/2001 | DeLorme et al. ............. | 701/201 |

(Continued)

FOREIGN PATENT DOCUMENTS

| | | |
|---|---|---|
| EP | 0747835 A1 | 12/1996 |
| JP | 9304107 A | 11/1997 |

(Continued)

OTHER PUBLICATIONS

International Search Report issued Sep. 17, 2007 for International Application No. PCT/EP2007/002194.

*Primary Examiner* — Thomas Tarcza
*Assistant Examiner* — Edward Pipala

(57) ABSTRACT

A method and device are disclosed for utilizing a selectable location marker for relational display of point of interest entries. In one embodiment, the method includes prompting selection of a point of interest location marker on a navigation device, and displaying selectable point of interest entries on the navigation device in an order based upon a location related to a selected point of interest location marker and a relative location of each of the selectable point of interest entries.

32 Claims, 5 Drawing Sheets

U.S. PATENT DOCUMENTS

| | | | |
|---|---|---|---|
| 6,374,180 B1 * | 4/2002 | Slominski et al. | 701/208 |
| 6,708,110 B2 * | 3/2004 | Stefan et al. | 701/209 |
| 6,850,837 B2 * | 2/2005 | Paulauskas et al. | 701/200 |
| 2002/0169547 A1 | 11/2002 | Harada | |
| 2003/0182052 A1 * | 9/2003 | DeLorme et al. | 701/201 |
| 2003/0191578 A1 * | 10/2003 | Paulauskas et al. | 701/200 |
| 2004/0030678 A1 | 2/2004 | Tu | |
| 2004/0243307 A1 | 12/2004 | Geelen | |
| 2006/0047425 A1 * | 3/2006 | Fukumi et al. | 701/209 |

FOREIGN PATENT DOCUMENTS

| | | |
|---|---|---|
| JP | 2002340596 A | 11/2002 |
| JP | 2003130663 A | 5/2003 |
| JP | 2003148974 A | 5/2003 |
| JP | 2004317205 A | 11/2004 |
| JP | 2005321224 A | 11/2005 |

* cited by examiner

ID AND DEVICE FOR UTILIZING
SELECTABLE LOCATION MARKER FOR
RELATIONAL DISPLAY OF POINT OF
INTEREST ENTRIES

CO-PENDING APPLICATIONS

The following applications are being filed concurrently with the present applications. The entire contents of each of the following applications is hereby incorporated herein by reference: A NAVIGATION DEVICE AND METHOD FOR STORING AND UTILIZING A LAST DOCKED LOCATION (Application No. 11/712,573) filed on even date herewith; A METHOD AND DEVICE FOR MAP SWITCHING (Application No. 11/712,578) filed on even date herewith; A NAVIGATION DEVICE AND METHOD FOR CONVEYING INFORMATION RELATIONSHIPS (Application No. 11/712,563) filed on even date herewith; A NAVIGATION DEVICE AND METHOD OF UPDATING INFORMATION ON A NAVIGATION DEVICE (Application No. 11/712,571) filed on even date herewith; A NAVIGATION DEVICE, SERVER, AND METHOD FOR COMMUNICATING THEREBETWEEN (Application No. 11/712,603) filed on even date herewith; A METHOD AND DEVICE FOR PROVIDING PREFERENCES DURING ROUTE TRAVEL CALCULATION ON A NAVIGATION DEVICE (Application No. 11/712,562) filed on even date herewith; A NAVIGATION DEVICE AND METHOD OF ACTIVATING INFORMATION ON A NAVIGATION DEVICE (Application No. 11/712,565) filed on even date herewith; AUTOMATIC DISCOVERY OF WIRELESS COMMUNICATION SETTINGS (Application No. 11/713,090) filed on even date herewith; A NAVIGATION DEVICE AND METHOD OF IMPLEMENTING AUDIO FEATURES IN A NAVIGATION DEVICE (Application No. 12/736,557) filed on even date herewith; METHODS OF CUSTOMIZING NAVIGATION SYSTEMS (Application No. 11/713,089) filed on even date herewith; and A NAVIGATION DEVICE AND METHOD FOR SEQUENTIAL MAP DISPLAY (Application No. 11/712,561) filed on even date herewith.

PRIORITY STATEMENT

The present application hereby claims priority under 35 U.S.C. §119 on each of Great Britain Patent Application numbers 0604709.6 filed Mar. 8, 2006; 0604708.8 filed Mar. 8, 2006; 0604710.4 filed Mar. 8, 2006; 0604704.7 filed Mar. 8, 2006; and 0604706.2 filed Mar. 8, 2006, the entire contents of each of which is hereby incorporated herein by reference.

FIELD

The present application generally relates to navigation methods and devices.

BACKGROUND

In known navigation systems, menus are used to display various travel destinations, desired locations, or desired points of interest. A user, for example, can select a category of restaurants, and can find a plurality of selections available. The user can then select a particular restaurant and then determine a route to that restaurant using the navigation system.

SUMMARY

The inventors discovered that although a plurality of selectable various travel destinations or locations were displayed in known navigation systems, listing a plurality of entries for example in various selectable categories, relative proximity of the entries was not displayed to the user. For example, in at least one embodiment, a method includes prompting selection of a point of interest location marker on a navigation device and displaying of selectable point of interest entries in an order based upon a location related to a selected point of interest location marker (for example, the current GPS location navigation device, a home of a user, a travel destination, etc.) and a relative location of each of the selectable point of interest entries.

In another embodiment, a navigation device includes an integrated input and display device to prompt selection of a point of interest location marker on a navigation device and to display selectable point of interest entries in an order based upon a location related to the selected point of interest location marker and a relative location of each of the selectable point of interest entries.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
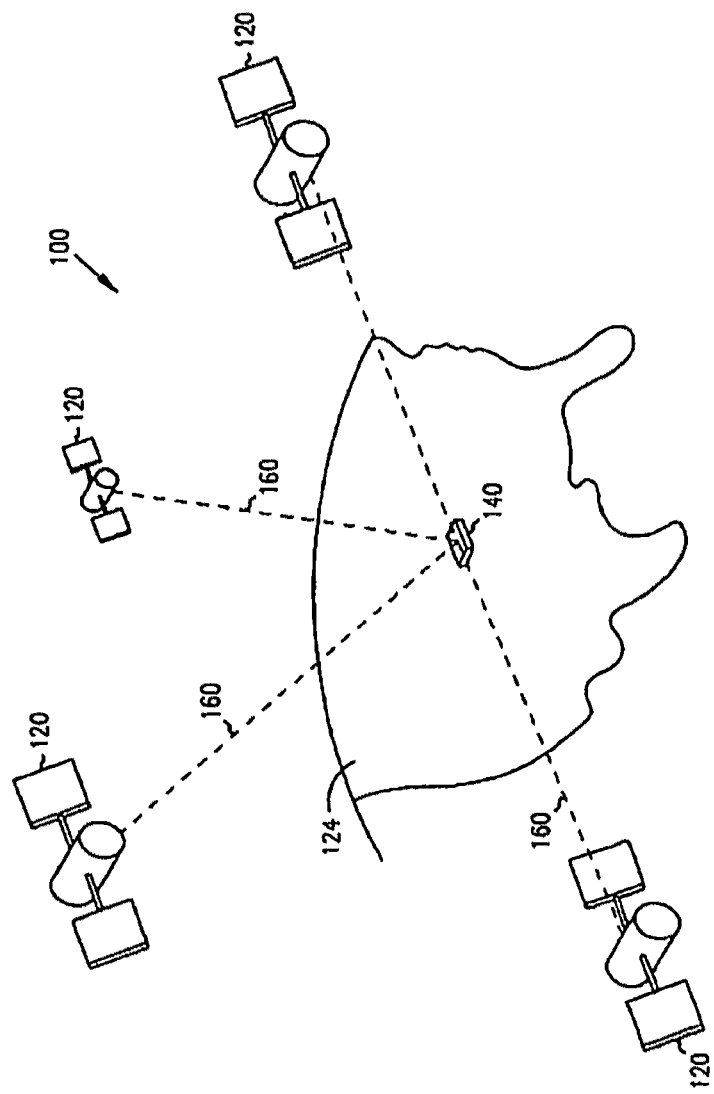
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
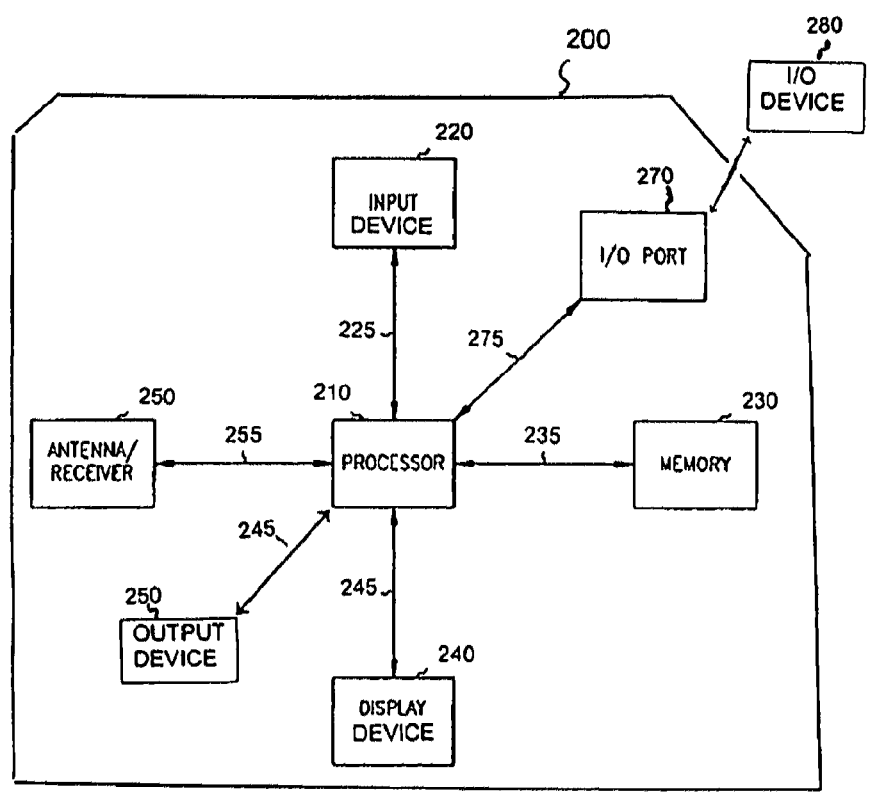
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a TCP/IP connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
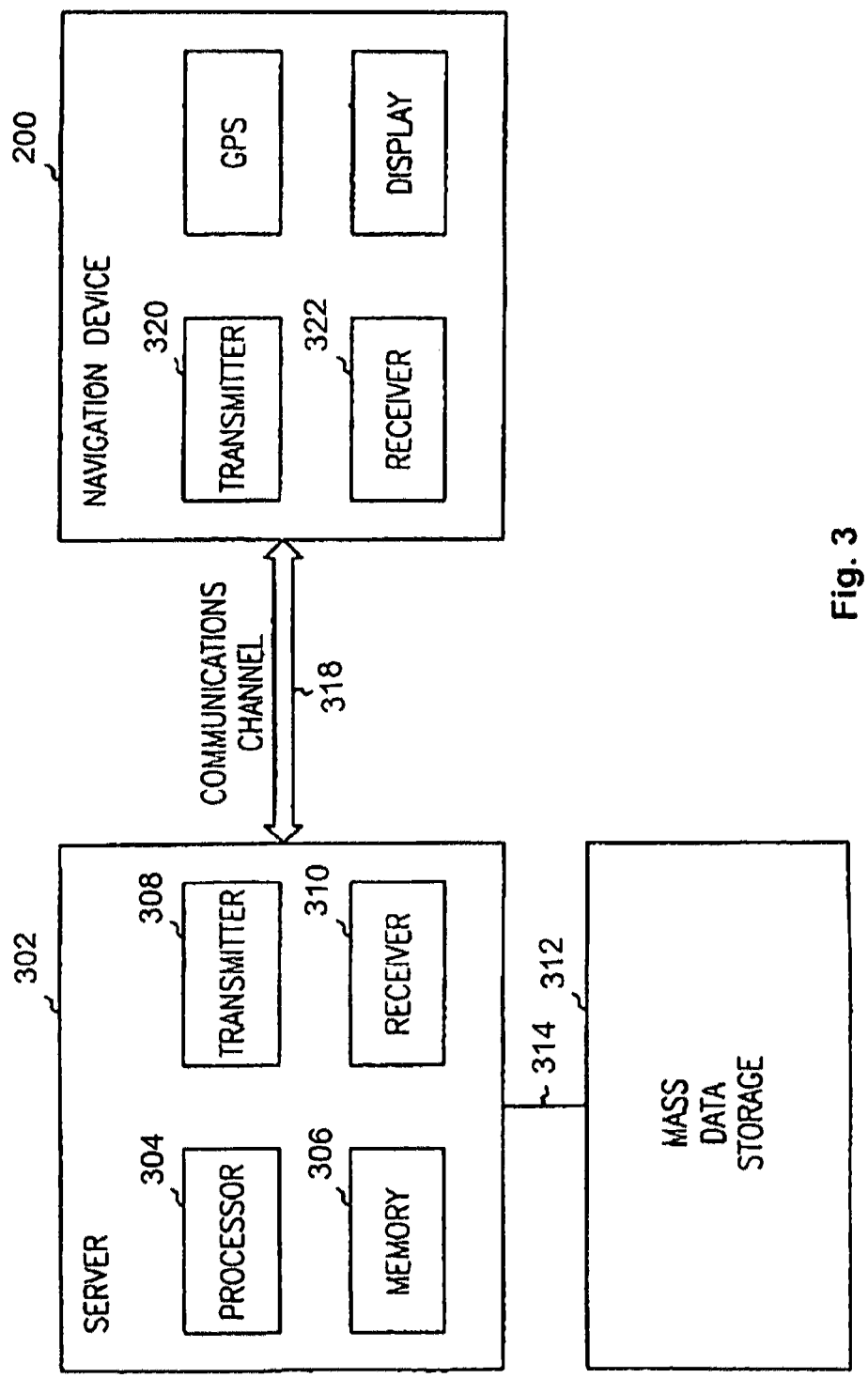
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks.

Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-ROMs for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

Figure 4:
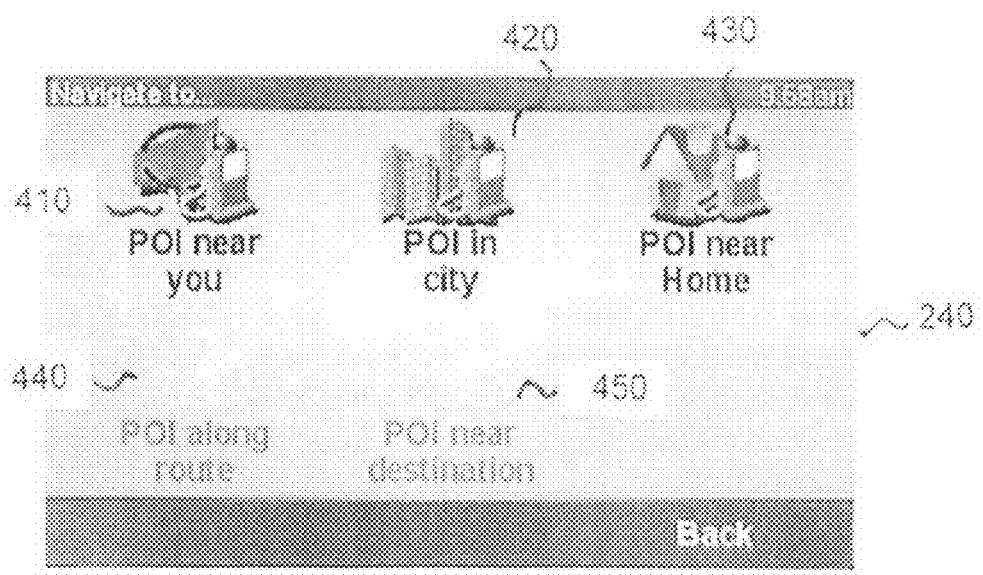
FIG. 4 illustrates of an example of a display screen of an embodiment of the present application.

FIG. 4 provides an illustration of an example embodiment of a display screen of the present application. FIG. 4 illustrates a display of display screen 240 of navigation device 200. The display screen 240 includes a plurality of point of interest location markers for selection by a user. Selection of any of these markers establishes a relative position from which points of interest can be measured, relatively ranked in terms of distance for example, etc.

As shown in FIG. 4, the display screen 240 prompts selection of a point of interest location marker on navigation device 200. The example markers shown in FIG. 4 can include "POI near you" 410 (establishing a relative marker based upon a current location of the navigation device 200 for example), "POI in city" 420 (establishing a relative marker based upon a location of a marker of the current city in which you are in such as the Empire State Building in New York city, for example), "POI near home" 430 (establishing a relative marker based upon a registered location of a home of the user of the navigation device 200 for example), and if a route has been selected, "POI along route" 440 (establishing a relative marker based upon a point along the selected route, for example), and "POI near destination" 450 (establishing a relative marker based upon an input travel destination, for example). It should be understood and appreciated that the markers shown in FIG. 4 are merely examples and are not inclusive of all possible markers, and noting that the embodiments of the present application should not be limited by the displayed words used to describe the particular markers in FIG. 4.

Thus, as shown in FIG. 4, a point of interest location marker (for example, a plurality of point of interest location markers) is prompted for selection on a navigation device 200. As shown in FIG. 4, the selectable point of interest location marker may include a plurality of location markers including at least two of a selectable marker for a location of the navigation device, a selectable marker for a location of a home of a user of the navigation device, and a selectable marker for a location of an input route destination, for example. Once a particular point of interest marker is selected, a plurality of selectable point of interest entries is then displayed on the navigation device 200 shown in FIG. 5.

Figure 5:
FIG. 5 illustrates of an example of a further display screen of an embodiment of the present application.

These selectable point of interest entries displayed on the navigation device 200 shown in FIG. 5 relate to a selected point of interest location marker, and are displayed (or a portion thereof, noting that further entries can be scrolled through, for example, and/or limitations can be included to limited the display to less than all, such as top ten for example) in an order based upon a location related to a selected point of interest location marker and a relative location of each of the selectable point of interest entries. For example, if the marker "POI near you" (410 of FIG. 4) is selected, the selectable point of interest entries are displayed in an order based upon a relative location to the current location of the navigation device itself. The order can be an ascending order and/or a descending order, for example.

It should be understood and appreciated that locations of points of interest are prestored or can be downloaded and subsequently stored in memory 230 of navigation device 200. Further, locations of the navigation device 200 is easily retrievable via GPS position location, and other markers such as home location, route destination, etc. can either be prestored or entered/selected by a user of the navigation device and subsequently stored in memory 230 in a known manner. Thus, with points of interest and marker locations stored/input/selected, distance or other calculations (for example, or any other calculations for relative ranking/display including but not limited to travel time to POI, total detour time, a marker showing whether a small detour is needed or POI is really along the route, etc. can easily be made by processor 200, along with organization by descending/ascending distance or and display thereof by processor 200 and display 420.

In any event, the method and navigation device 200 of an embodiment of the present application provides the user with an ability to view a plurality of selectable point of interest entries based upon viewable locational relationships between a selected point of interest location marker and the selectable point of interest entries themselves. Accordingly, if the user is looking for points of interest close to a present location of the navigation device 200, the user can find the points of interest which are relatively closest and relatively furthest from the navigation device 200 upon selection of the "POI near you" location marker. Thereafter, selectable point of interest entries will be displayed in an order based upon a location of the current GPS location of the navigation device 200, and a relative location of each of the selectable point of interest entries.

In a similar manner, if the location marker "POI near home" (430 of FIG. 4) is selected, the selectable entries will be displayed in an order based upon a location of the home of the user (input or determined upon registration of the navigation device 200, for example), and a relative location of each of the selectable point of interest entries.

Further, in a similar manner, if the location marker "POI near destination" (450 of FIG. 4) is selected, the selectable entries will be displayed in an order based upon a location of a selected/input travel destination of the user (input/selected previously for a route calculation, for example), and a relative location of each of the selectable point of interest entries. It should be noted that similar operations occur based upon selection of any point of interest location marker, including but not limited to those shown in FIG. 4.

As shown in FIG. 5, the selectable entries may also be displayed in conjunction with distance information, the distance information indicating a distance between the location related to the selected point of interest marker and the location of each of the selectable entries. Accordingly, assuming the marker "POI near home" 430 is selected for example, the "bulldog" is displayed as being relatively closest to the home of the user/owner of the navigation device 200 based upon the registered home location for example, 45 meters from the home of the user/owner of the location of the navigation device 200, the distance information being displayed relative to the particular point of interest location marker selected. Similar to display of the distance of 45 meters for the bulldog of FIG. 5, each of the selectable point of interest entries can be displayed on display 240 of navigation device 200 in accordance with their distance relative to the selected marker. This display can be in order of increasing distance, decreasing distance, etc., so that the user of the navigation device 200 is then able to view each of a plurality of points of interest entries in relation to a selectable marker location.

Accordingly, as shown in FIG. 4 for example, the prompting may include prompting of one of a plurality of point of interest location markers, and the prompting can include display of the plurality of point of interest location markers. Upon a point of interest location marker relating to a current navigation device 200 location being selected, the selectable entries are displayed in an order based upon a current GPS position location of the navigation device 200 and a relative location of the selectable point of interest entries. Upon a point of interest location marker relating to a location of a home of a user of the navigation device 200 being selected, the selectable entries are displayed in an order based upon a stored location of home of the user of the navigation device 200 and a location of at least a portion of the selectable entries. Similarly, upon a point of interest location marker relating to a route destination input (via input/selection/etc.) to the navigation device 200 being selected, the selectable entries are displayed in an order based upon a stored location of the route destination and a location of at least a portion of the selectable entries. Similar operations occur based upon selection of any point of interest location marker, including but not limited to those shown in FIG. 4.

It should be understood that an embodiment of the present application can encompass implementation of the method into a navigation device itself. Further, an embodiment of the present application also includes a navigation device 200 including an integrated input and display device to prompt selection of a point of interest location marker on a navigation device and to display selectable point of interest entries in an order based upon a location related to the selected point of interest location marker and a relative location of each of the selectable point of interest entries.

Figure 6:
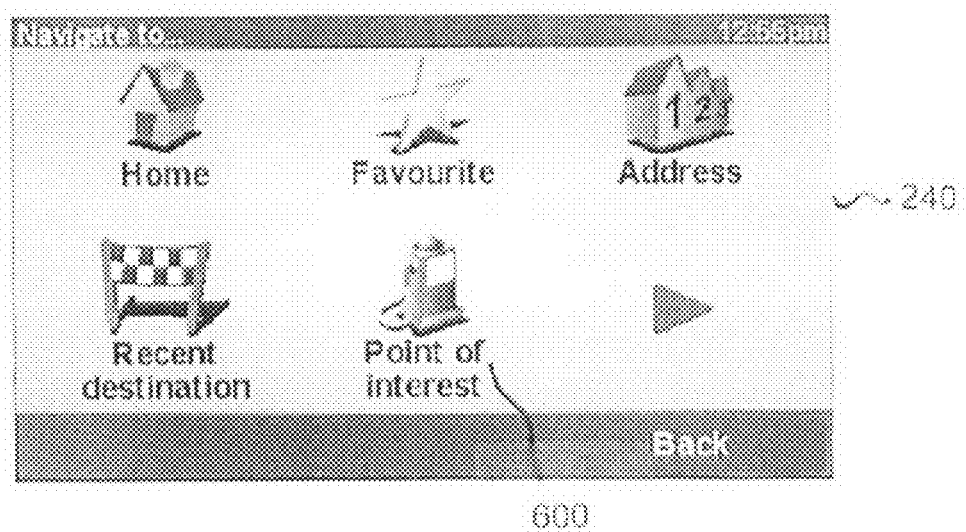
FIG. 6 illustrates of an example of a further display screen of an embodiment of the present application.

In addition, it should be further understood and appreciated that embodiments of the present application can include prompting and/or display of a selection of a general point of interest category from a general menu prior to the display of FIG. 4. For example, on a general menu display, a prompt for "point of interest" 600 can be displayed on display 240, as shown in FIG. 6 for example. Further, it should be further understood and appreciated that embodiments of the present application can include prompting and/or display of a selection of point of interest categories after selection of a point of interest location marker, including a display of a plurality of different categories including but not limited to restaurants, city sites, museums, sports, etc., wherein points of interest in these categories may then be relatively displayed in relation to a selected point of interest location marker.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method comprising:
    prompting selection of a point of interest location marker displayed on a navigation device, the point of interest location marker being an icon representing a previously user-entered location stored locally on the navigation device, the user entered location being remote from a current location of the navigation device;
    receiving a user input to select the displayed point of interest location marker to establish a location marker relative to which nearby points of interest are subsequently displayed on the navigation device in a list of selectable point of interest entries, wherein each of the selectable point of interest entries displayed in the list include a distance indicative of a distance between the location marker and the point of interest represented by the particular list entry;
    receiving user selection of one of the selectable point of interest entries; and,
    setting the selected point of interest as a navigation destination.

2. The method of claim 1, wherein the prompting includes prompting selection of one of a plurality of point of interest location markers.

3. The method of claim 1, wherein the prompting Includes display of a plurality of point of interest location markers.

4. The method of claim 1, wherein the selectable point of interest location marker includes a plurality of location markers including at least two of a selectable marker for a location of the navigation device, a selectable marker for a location of a home of a user of the navigation device, and a selectable marker for a location of an input route destination.

5. The method of claim 4, wherein, upon the selectable marker for the location of the navigation device being selected, displaying the selectable point of interest entries in an order based upon a current GPS location of the navigation device and a relative location of each of the selectable point of interest entries.

6. The method of claim 5, wherein the displaying includes displaying the selectable point of interest entries in conjunction with distance information for each selectable point of interest entry, the distance information for each selectable point of interest entry indicating a distance between the current GPS location of the navigation device and a location of each of the selectable point of interest entries.

7. The method of claim 4, wherein, upon the selectable marker for the location of a home of a user of the navigation device being selected, displaying the selectable point of interest entries in an order based upon a stored location of a home of the user of the navigation device and a relative location of each of the selectable point of interest entries.

8. The method of claim 7, wherein the displaying includes displaying the selectable point of interest entries in conjunction with distance information for each selectable point of interest entry, the distance information for each selectable point of interest entry indicating a distance between the stored location of a home of the user of the navigation device and the location of each of the selectable point of interest entries.

9. The method of claim 4, wherein, upon the selectable marker for the location of an input route destination being selected, displaying the selectable point of interest entries in an order based upon the location of a point along the selected route and a relative location of each of the selectable point of interest entries.

10. The method of claim 9, wherein the displaying includes displaying the selectable point of interest entries in conjunction with distance information for each selectable point of interest entry, the distance information for each selectable point of interest entry indicating a distance between location of a point along the selected route and the location of each of the selectable point of interest entries.

11. The method of claim 1, further comprising prompting, subsequent to selection of a prompted point of interest location marker, selection of a point of interest category, wherein the displaying includes display of selectable point of interest entries within a selected point of Interest category.

12. The method of claim 1, further comprising prompting, prior to selection of a prompted point of interest location marker, selection of point of interest from a general menu.

13. The method of claim 12, further comprising prompting, subsequent to selection of a prompted point of Interest location marker, selection of a point of interest category, wherein the displaying includes display of selectable point of Interest entries within a selected point of interest category.

14. A computer readable medium including program segments for, when executed on a processor of a navigation device, causing the navigation device to implement the method of claim 1.

15. The method of claim 1, wherein displaying the selectable point of interest entries includes displaying the entries In a text list with distance information on a display of the navigation device.

16. A navigation device, comprising:
an integrated input and display device;
a processor operatively connected to the input and display device and configured to receive input from the integrated input and display device; and
a memory operatively connected to the processor, the memory being configured to store locations of points of interest, wherein
the integrated input and display device is configured to:
prompt selection of a point of interest location marker representing a previously user-entered location stored locally on the navigation device, the user-entered location being remote from a current location of the navigation device, and to display selectable point of interest entries in an order based upon a location related to a selected point of interest location marker and a relative location of each of the selectable point of interest entries to the user entered location; and
receive user selection of one of the selectable point of interest entries; and, set the selected point of interest as a navigation destination.

17. The navigation device of claim 16, wherein the selectable point of interest entries are displayable by the integrated input and display device in conjunction with distance information, the distance information indicating a distance between the location related to the selected point of interest location marker and the location of each of the selectable point of interest entries.

18. The navigation device of claim 17, wherein the prompting includes display of a plurality of point of interest location markers.

19. The navigation device of claim 17, wherein the selectable point of interest location marker includes a plurality of location markers including at least two of a selectable marker for a location of the navigation device, a selectable marker for a location of a home of a user of the navigation device, and a selectable marker for a location of an input route destination.

20. The navigation device of claim 19, wherein, upon the selectable marker for the location of the navigation device being selected, the integrated input and display device is used to display the selectable point of interest entries in an order based upon a current OPS location of the navigation device and a relative location of each of the selectable point of interest entries.

21. The navigation device of claim 20, wherein the selectable point of interest entries are displayable by the integrated input and display device in conjunction with distance information for each selectable point of interest entry, the distance information for each selectable point of interest entry indicating a distance between the current GPS location of the navigation device and a location of each of the selectable point of interest entries.

22. The navigation device of claim 19, wherein, upon the selectable marker for the location of a home of a user of the navigation device being selected, the integrated input and display device is used to display the selectable point of interest entries in an order based upon a stored location of a home of the user of the navigation device amid a relative location of each of the selectable point of interest entries.

23. The navigation device of claim 22, wherein the selectable point of Interest entries are displayable by the integrated input and display device in conjunction with distance Information for each selectable point of interest entry, the distance information for each selectable point of interest entry indicating a distance between the stored location of a home of the user of the navigation device and the location of each of the selectable point of interest entries.

24. The navigation device of claim 19, wherein, upon the selectable marker for the location of an input route destination being selected, the integrated input and display device is used to display the selectable point of interest entries in an order based upon the location of a point along the selected route and a relative location of each of the selectable point of interest entries.

25. The navigation device of claim 24, wherein the selectable point of interest entries are displayable by the integrated input and display device In conjunction with distance information for each selectable point of interest entry, the distance information for each selectable point of interest entry indicating a distance between location of a point along the selected route and the location of each of the selectable point of interest entries.

26. The navigation device of claim 17, wherein the prompting includes prompting selection of one of a plurality of point of interest location markers.

27. The navigation device of claim 16, wherein the integrated input and display device is further used to prompt, subsequent to selection of a prompted point of interest location marker, selection of a point of interest category, and is further used to display selectable point of interest entries within a selected point of interest category.

28. The navigation device of claim 27, wherein the integrated input and display device is further used to prompt, subsequent to selection of a prompted point of interest location marker, selection of a point of interest category, and is further used to display selectable point of interest entries within a selected point of interest category.

29. The navigation device of claim 16, wherein the integrated Input and display device is further used to prompt, prior to selection of a prompted point of Interest location marker, selection of point of interest from a general menu.

30. The navigation device of claim 16, wherein the processor is further configured to control selecting the displayed point of interest marker to establish a location marker relative to which nearby points of interest may be subsequently displayed on the navigation device in a list of selectable point of interest entries, wherein each of the selectable point of Interest entries displayed in the list include a distance indicative of a distance between the location marker and the point of interest represented by the particular list entry.

31. A method for use on a navigation device, the method comprising:
prompting selection of a point of interest location marker displayed on the navigation device;

receiving a user input to select a first location, remote from a current location of the navigation device, to establish a location marker relative to which nearby points of interest are subsequently displayed on the navigation device in a list of selectable point of interest entries, wherein each of the selectable point of interest entries displayed in the list include a distance indicative of a distance between the location marker and the point of interest represented by the particular list entry;

receiving user selection of one of the selectable point of interest entries; and, setting the selected point of interest as a navigation destination.

32. A method for use on a navigation device, the method comprising:

prompting selection of a destination;

receiving a user input to select a destination;

calculating a route to the destination from a current location of the navigation device;

establishing a list of points of interest that are less than a predetermined distance away from the calculated route;

displaying on the navigation device in a list of selectable point of interest entries, wherein each of the selectable point of interest entries displayed in the list include a distance indicative of a distance between a point along the route and the point of interest represented by the particular list entry;

receiving user selection of one of the selectable point of interest entries; and, setting the selected point of interest as a second destination.

* * * * *